US007362736B2

(12) United States Patent
Suzuki

(10) Patent No.: US 7,362,736 B2
(45) Date of Patent: Apr. 22, 2008

(54) WIRELESS INFORMATION TRANSMITTING SYSTEM, RADIO COMMUNICATION METHOD, RADIO STATION, AND RADIO TERMINAL DEVICE

(75) Inventor: Hideyuki Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 613 days.

(21) Appl. No.: 10/489,109

(22) PCT Filed: Jul. 16, 2003

(86) PCT No.: PCT/JP03/09020

§ 371 (c)(1),
(2), (4) Date: Mar. 10, 2004

(87) PCT Pub. No.: WO2004/014023

PCT Pub. Date: Feb. 12, 2004

(65) Prior Publication Data

US 2004/0240411 A1  Dec. 2, 2004

(30) Foreign Application Priority Data

Jul. 19, 2002  (JP) .............................. 2002-210625

(51) Int. Cl.
*H04Q 7/24* (2006.01)
(52) U.S. Cl. ...................... 370/338; 370/331; 455/433; 455/435.1; 455/435.2; 455/436; 455/438
(58) Field of Classification Search ................ 370/331, 370/338; 455/410, 411, 433, 435.1, 435.2, 455/438
See application file for complete search history.

(56) References Cited

U.S. PATENT DOCUMENTS 6,370,380 B1 * 4/2002 Norefors et al. ............ 455/436

(Continued)

FOREIGN PATENT DOCUMENTS

JP  2000-333234  11/2000

(Continued)

OTHER PUBLICATIONS

Bernard Aboba, et al., "A Model for Context Transfer in IEEE 802", Network Working Group, XP-002288528, Apr. 6, 2002, pp. 1-16.

(Continued)

*Primary Examiner*—Rafael Perez-Gutierrez
*Assistant Examiner*—Abdias Mondesir
(74) *Attorney, Agent, or Firm*—Oblon, Spivak, McClelland, Maier & Neustadt, P.C.

(57) ABSTRACT

Movable wireless terminals are connected to wireless stations. The wireless stations periodically transmit beacons that contain domain information of access networks that the wireless stations provide. Before the wireless terminals move, they receive beacons from the wireless stations to which they will be probably connected to next based on their position and obtain the domain information from the beacons. As a result, the wireless terminals are capable of detecting their own moving granularities. In accordance with the moving granularities, the wireless terminals determine whether authentication information should be transferred to wireless stations to which the wireless terminals will be probably connected next or that an authenticating server should newly perform an authenticating process for the wireless terminals after they are connected to the next wireless stations.

10 Claims, 11 Drawing Sheets

U.S. PATENT DOCUMENTS

| | | |
|---|---|---|
| 6,587,680 B1 * | 7/2003 | Ala-Laurila et al. ........ 455/411 |
| 7,065,067 B2 * | 6/2006 | Song et al. ................. 370/338 |
| 7,149,524 B2 * | 12/2006 | Reynolds .................... 455/437 |
| 2004/0240411 A1 | 12/2004 | Suzuki |
| 2005/0213545 A1 * | 9/2005 | Choyi et al. ................ 370/338 |

FOREIGN PATENT DOCUMENTS

| | | |
|---|---|---|
| JP | 2001-258059 | 9/2001 |
| WO | 00/69186 | 11/2000 |
| WO | WO 01/39538 A1 | 5/2001 |

OTHER PUBLICATIONS

Rajeev Koodli, et al., "Fast Handovers and Context Transfers in Mobile Networks", Computer Communication Review, vol. 31, No. 5, XP-001115324, Oct. 2001, pp. 37-47.

U.S. Appl. No. 11/742,989, filed May 1, 2007, Suzuki et al.

* cited by examiner

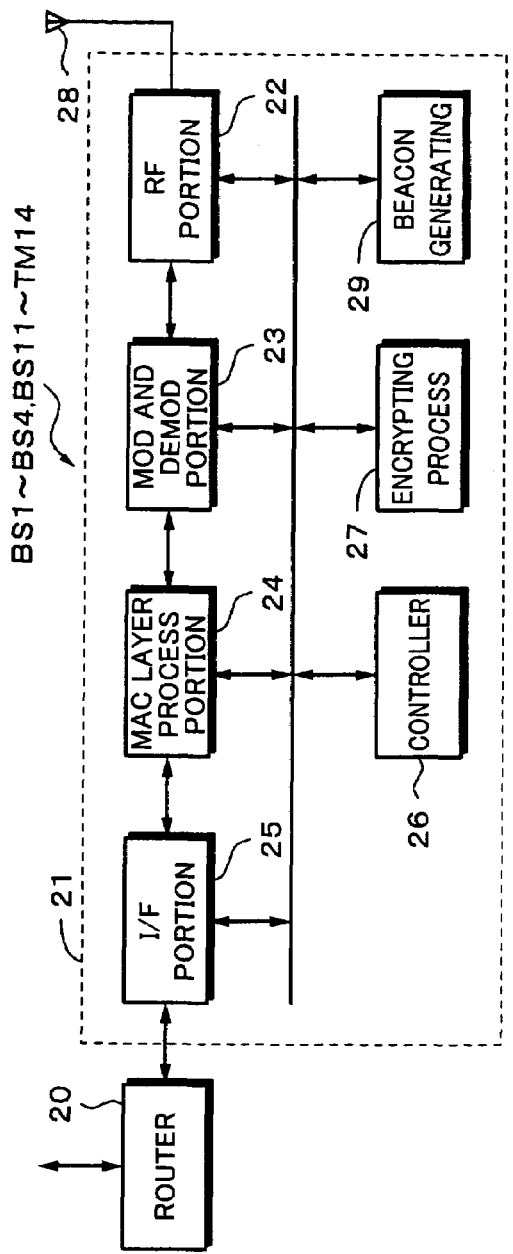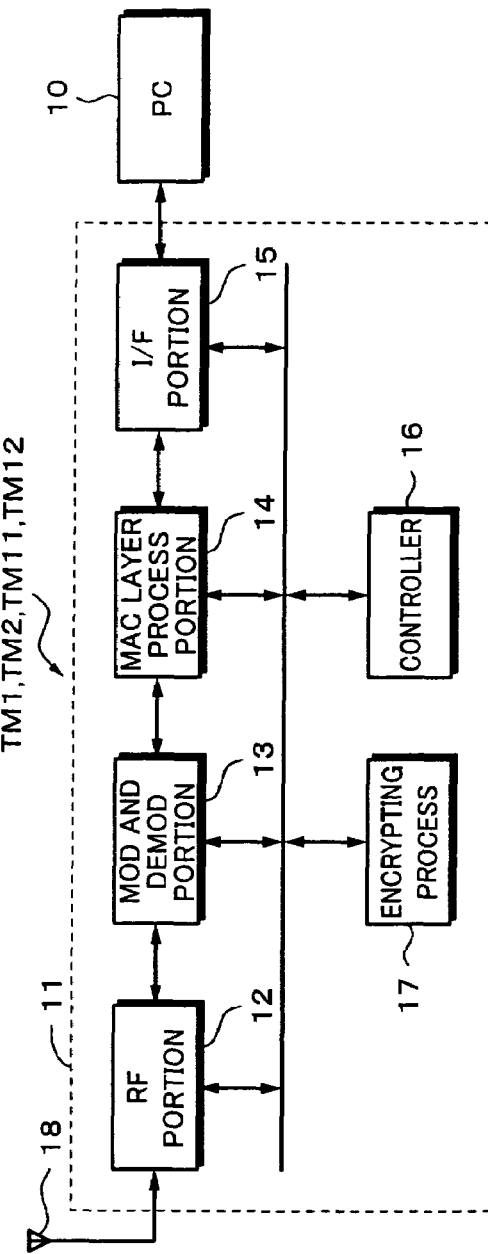
Fig. 3A
Fig. 3B

HEADER PORTION
- SENDER ADDRESS (ADDRESS OF WIRELESS STATION)
- DESTINATION ADDRESS (BROADCAST ADDRESS)
- PACKET TYPE, etc.

PAYLOAD PORTION
- INFORMATION ABOUT WIRELESS STATION (DOMAIN INFORMATION)

WIRELESS INFORMATION TRANSMITTING SYSTEM, RADIO COMMUNICATION METHOD, RADIO STATION, AND RADIO TERMINAL DEVICE

TECHNICAL FIELD

The present invention relates to a wireless information transferring system and a wireless communicating method that are suitable for a wireless Local Area Network (LAN) network service. In addition, the present invention relates to a wireless station and a wireless terminal apparatus for use with a wireless information system, in particular, to a handover process performed as a wireless terminal moves.

BACKGROUND ART

In recent years, wireless LANs have been widely used in offices and homes. In addition, wireless LAN network services that can be used in designated town areas such as train stations, airports, and fast food chain stores have been started. In such wireless LAN network services, wireless stations that are called access points are disposed. The wireless stations as access points are connected to an external backbone network through routers.

When a wireless LAN network service is used, a wireless LAN interface card is attached to an information terminal such as a portable personal computer or a Personal Digital Assistant (PDA). The wireless terminal to which the wireless LAN interface card has been attached is wirelessly connected to a wireless station as an access point. Thus, a portable personal computer and a PDA as a wireless terminal is capable of accessing an external backbone network at high speed.

The service area of one access point of such a wireless LAN network service is at most in the range from several ten meters to several hundred meters. Thus, one access point is incapable of securing a wide service area.

Thus, in the wireless LAN network service, a plurality of access points are geographically continuously disposed so that wireless terminals that move in a wide range are capable of receiving the network service. In addition, the service areas of adjacent access points are overlapped so as to allow a wireless terminal that moves among service areas (called cells) of a plurality of access points to communicate as continuously as possible. In addition, the wireless terminal side monitors communication radio wave states of access points so as to maintain an optimum communication state. If the communication state of the wireless terminal against the current access point deteriorates as it moves, it switches the current access point to another access point that allows the wireless terminal to have a good communication state.

Such an access point switching operation is called a handover. By performing a handover, the wireless terminal is capable of securing a wide service area.

In addition, a wireless LAN network is subject to intercepting and attacks by malicious third parties. Thus, it is necessary to consider communication securities. In a wireless LAN network system using a 4 GHz band, an encrypting mechanism called Wired Equivalent Privacy (WEP) is used. Data to be communicated between an access point and a wireless LAN wireless terminal is encrypted by a designated encryption key. A packet that has not been encrypted with a correct WEP key is rejected so as to assure an access control against an illegal network access.

However, it has been pointed out that the WEP is weak against attacks. (For example, Nikita Borisov states that codes can be relatively easily decoded due to weakness of the WEP. Refer to "Intercepting Mobile Communication—The Insecurity of 802.11", White Paper, January 2001.) Thus, to prevent a wireless LAN network from being maliciously and illegally accessed, it has been proposed to use IEEE 802.1x"Port-based network access control". In this system, an authenticating server authenticates a user with his or her user ID and password. An encryption key is dynamically created for each session so as to encrypt data with the created encryption key for a wireless region. In the proposed system, since an encryption key is dynamically created for each session, not fixed, security for data is more improved than the conventional WEP system.

However, in the proposed system, the authenticating server needs to authenticate a user with his or her user ID and password for each session. Thus, when the wireless terminal performs a handover, the load and communication cost on both the wireless terminal side and the wireless station side as access points remarkably would increase.

In other words, as described above, a plurality of access points are geographically continuously disposed so as to secure a wide service area. When a wireless terminal moves, a handover takes place. The wireless terminal switches the current access point to another access point depending on the communication state of the current access point. In the system of which the authenticating server creates an encryption key, whenever an handover takes place and a new session starts, the wireless terminal should be authenticated by the authenticating server through a wireless station as an access point to which the wireless terminal is newly connected. Thus, whenever an handover takes place, it is necessary to re-designate an encryption key for data that the wireless terminal communicates to the wireless station. Thus, the load and communication cost of both the wireless terminal side and the wireless station side as access points would increase.

In addition, in the structure of which the authenticating server encrypts data, when an handover takes place, an application that is operating on the communication wireless terminal is incapable of restoring the communication until the authenticating server has completed the authentication and key designation.

To prevent the load and communication cost from increasing upon occurrence of an handover and an application from interrupting, the Institution Electrical and Electronics Engineers (IEEE) and the Internet Engineering Task Force (IETF) are evaluating a technology of which a wireless station as an access point from which the wireless terminal performs a handover pre-transfers authentication information about the wireless terminal to a wireless station as an access point to which the wireless terminal performs the handover so as to omit operations (authentication and key designation) performed when the wireless terminal performs the handover and is connected to the new wireless station. This technology is generally called context transfer. By performing the context transfer, the wireless terminal is capable of communicating with a new wireless station to which the wireless terminal has performed a handover using the same encryption key used for the wireless station from which the wireless terminal performs a handover.

When the wireless terminal moves in a management area of the same authenticating server, even if the wireless terminal performs a handover, a wireless station from which the wireless terminal performs the handover performs the context transfer to a wireless station to which the wireless terminal performs the handover, the wireless terminal is capable of communicating with the wireless station to which the wireless terminal performs the handover using the same encryption key that has been designated for the wireless station from which the wireless terminal performs the handover. As a result, even if a handover takes place, the load and communication cost can be prevented from increasing and the application from being interrupted.

However, it should be noted that the context transfer is capable of transferring authentication information only when the wireless terminal moves in the management area of the same authenticating server. Thus, when the wireless terminal moves out of the management area of the authenticating server, the wireless station from which the wireless terminal performs the handover is incapable of transferring the authentication information to a wireless station as an access point to which the wireless terminal performs the handover. In other words, only when "authentication information that the wireless station to which the wireless terminal is currently connected transfers a wireless station to which the wireless terminal will be probably connected next" is equal to "authentication information that the wireless terminal is capable of obtaining by causing the authenticating server to authenticate the wireless terminal through the wireless station to which the wireless terminal will be probably connected next". Otherwise, an authenticating server that manages a wireless station to which the wireless terminal will be connected needs to authenticate it through the wireless station and create an encryption key. Due to this fact, a mechanism that allows a wireless terminal that moves to accomplish and select an authenticating method in accordance with its own moving granularity/moving frequency is required.

The moving granularity represents the physical/logical difference between a subnet from which a mobile wireless terminal moves and a subnet to which it moves. The physical/logical difference is a difference on an access management of whether a plurality of sub nets are provide by the same provider or different providers or a difference on service of whether or not a sub net provides a smooth handoff service that does not interrupt when the wireless terminal moves.

DISCLOSURE OF THE INVENTION

Therefore, an object of the present invention is to provide a wireless information transferring system, a wireless communicating method, a wireless station, and a wireless terminal apparatus for causing a wireless terminal not to be authenticated when it moves to a service area of a wireless station to which the wireless terminal performs a handover in the same domain and to be authenticated when the wireless terminal moves to a service area of a wireless station in another domain and allowing the wireless terminal to perform a handover to the wireless station so as to allow the wireless terminal that moves to accomplish and select an authenticating method in accordance with its own moving granularity/moving frequency.

The present invention is a wireless information transferring system, comprising: a plurality of wireless stations; a wireless terminal wirelessly connected to the plurality of wireless stations; a router for connecting the plurality of wireless stations and a network; and an authenticating server for authenticating the wireless terminal, wherein the wireless stations are configured to periodically transmit beacons that contain domain information of access networks that the wireless stations provide, wherein when the wireless terminal performs a handover, before the wireless terminal moves, it is configured to receive a beacon from a wireless station to which the wireless terminal will be probably connected next, obtain domain information of the wireless station to which the wireless terminal will be probably connected next from the beacon, determine whether authentication information should be transferred to the wireless station to which the wireless terminal will be probably connected next or the authenticating server should newly perform an authenticating process for the wireless terminal after it is connected to the next wireless station, wherein when the determined result represents that the authentication information should be transferred to the wireless station to which the wireless terminal will be probably connected next, the authentication information is transferred to the wireless station to which the wireless terminal will be probably connected next, and wherein when the determined result represents that the authenticating server should newly perform the authenticating process for the wireless terminal after it is connected to the next wireless station, the authenticating server newly performs the authenticating process for the wireless terminal after it is connected to the next wireless station.

The present invention is a wireless communicating method for a wireless information transferring system having a plurality of wireless stations; a wireless terminal wirelessly connected to the plurality of wireless stations; a router for connecting the plurality of wireless stations and a network; and an authenticating server for authenticating the wireless terminal, the wireless communicating method comprising the steps of: causing the wireless stations to periodically transmit beacons that contain domain information of access networks that the wireless stations provide; causing the wireless terminal to receive a beacon from a wireless station to which the wireless terminal will be probably connected next, obtain domain information of the wireless station to which the wireless terminal will be probably connected next from the beacon, determine whether authentication information should be transferred to the wireless station to which the wireless terminal will be probably connected next or the authenticating server should newly perform an authenticating process for the wireless terminal after it is connected to the next wireless station, when the wireless terminal performs a handover, before the wireless terminal moves; transferring the authentication information to the wireless station to which the wireless terminal will be probably connected next when the determined result represents that the authentication information should be transferred to the wireless station to which the wireless terminal will be probably connected next; and causing the authenticating server to newly perform an authenticating process for the wireless terminal, when the determined result represents that the authenticating server should newly perform the authenticating process for the wireless terminal after it is connected to the next wireless station.

The present invention is a wireless station connected to a wireless terminal wirelessly and to a network through a router, the wireless station comprising: means for periodically transmitting a beacon that contains domain information of an access network that the wireless station provides; means for transferring authentication information to a wireless station to which the wireless terminal will be probably connected next when the wireless terminal sends a handover request to the wireless station to which the wireless terminal is currently connected; and means for wirelessly communicating with the wireless terminal that has moved with authentication information transferred from another wireless station.

The present invention is a wireless terminal apparatus, comprising: means for receiving a beacon from a wireless station to which the wireless terminal apparatus will be probably connected next when the wireless terminal apparatus performs a handover, before the wireless terminal apparatus moves; means for obtaining domain information of the wireless station to which the wireless station apparatus will be probably connected next from the beacon and determining whether authentication information should be transferred to the wireless station to which the wireless terminal apparatus will be probably connected next or an authenticating server should newly perform an authenticating process for the wireless terminal apparatus after it is connected to the next wireless station; means for transmitting the authentication information to the wireless station to which the wireless terminal apparatus will be probably connected next when the determined result represents that the authentication information should be transferred to the wireless station to which the wireless terminal apparatus will be probably connected next; and means for causing the authenticating server to newly perform the authenticating process for the wireless terminal apparatus after it is connected to the next wireless station when the determined result represents that the authenticating server should newly perform the authenticating process for the wireless terminal apparatus.

According to the present invention, a beacon periodically transmitted by a wireless station to which a wireless terminal is connected contains domain information of an access network that the wireless station provides. Before the wireless terminal moves, it receives a beacon from a wireless station that will be probably connected next and obtains domain information therefrom. As a result, the wireless terminal is capable of detecting-its own moving granularity. In accordance with the moving granularity, the wireless terminal determines whether to transfer authentication information to a wireless station to which the wireless terminal will be probably connected or to cause an authenticating server to newly perform an authenticating process for the wireless terminal when it is connected to the next wireless station.

BRIEF DESCRIPTION OF DRAWINGS

FIG. 3A and FIG. 3B are block diagrams showing structures of a wireless station as an access point and a wireless terminal according to the present invention, respectively;

BEST MODES FOR CARRYING OUT THE INVENTION

Figure 1:
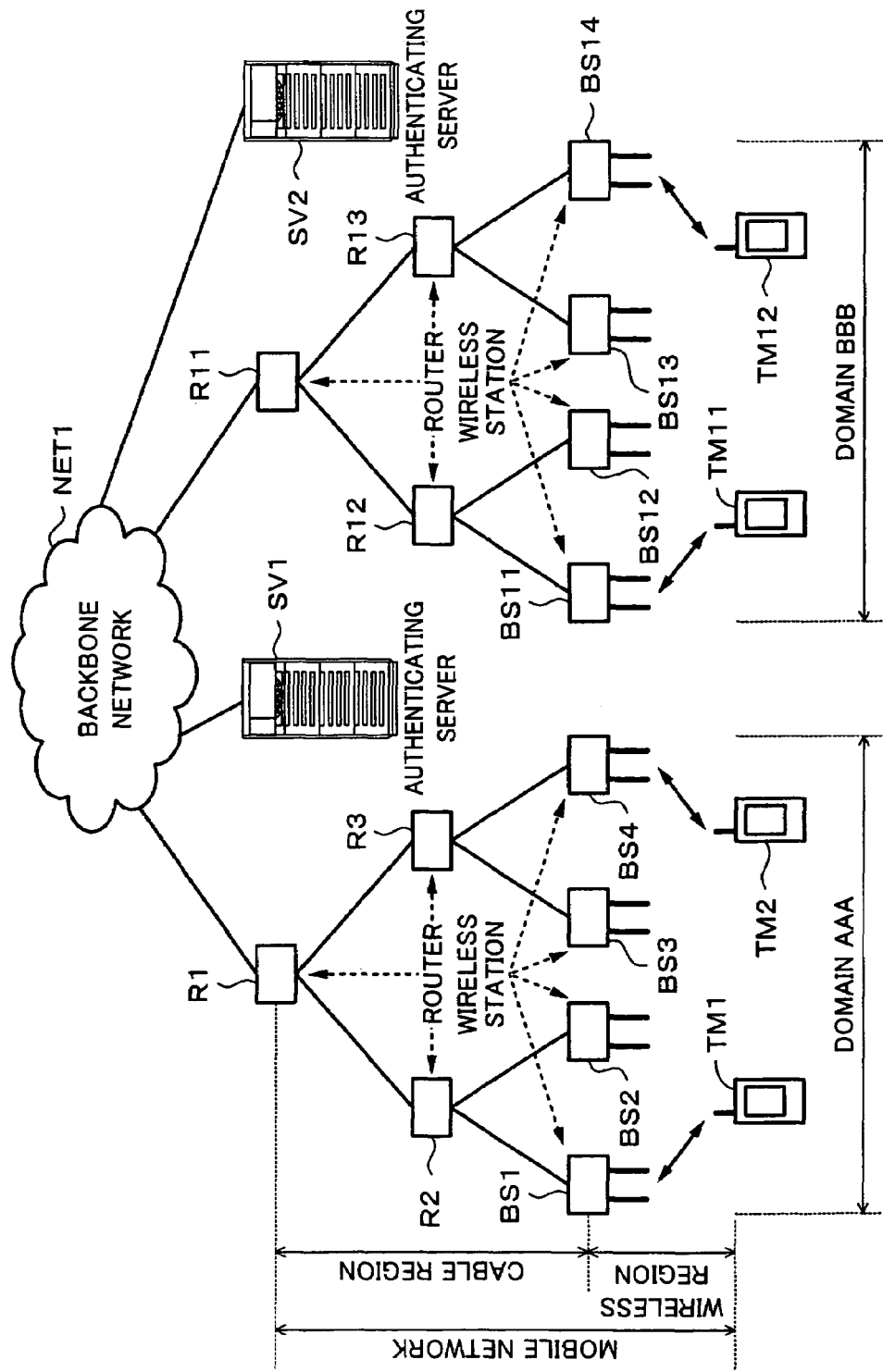
FIG. 1 is a block diagram showing an outline of a wireless LAN network system according to the present invention.

Next, with reference to the accompanying drawings, an embodiment of the present invention will be described. FIG. 1 shows an outline of a wireless LAN network service according to the present invention.

In the example shown in FIG. 1, two service networks that are wireless LAN network services managed and operated by domain AAA Internet Service Provider (ISP) and domain BBB ISP.

In the wireless LAN network service managed and operated by the domain AAA ISP, wireless stations BS1 to BS4 are disposed as wireless stations of access points. The wireless stations BS1 to BS4 are wireless stations of access points of a wireless LAN having a router function. The wireless stations BS1 to BS4 wirelessly communicate with wireless terminals TM1 and TM2. These wireless stations BS1 to BS4 are connected to a backbone network NET1 through routers R1 to R3 with cables. Among the routers R1 to R3 of the same domain AAA, the router R1 is a default router that exchanges packets with the external backbone network NET1.

In the wireless LAN network service managed and operated by the domain BBB ISP, wireless stations BS11 to BS14 are disposed as wireless station of access points. The wireless stations BS11 to BS14 are access points of a wireless LAN having a router function. The wireless stations BS11 to BS14 wirelessly communicate with wireless terminals TM11 and TM12. These wireless stations BS11 to BS14 are connected to the backbone network NET1 through routers R11 to R13 with cables. Among the routers R11 to R13 of the same domain BBB, the router R11 is a default router that exchanges packets with the backbone network NET1.

The wireless stations BS1 to BS4 and BS11 to BS14 as access points wirelessly communicate with the wireless terminals TM1 and TM2 and the wireless terminals TM11 and TM12, respectively. Data to be transmitted and received is packetized as shown in FIG. 2 and the packetized data is transferred.

Figure 2:
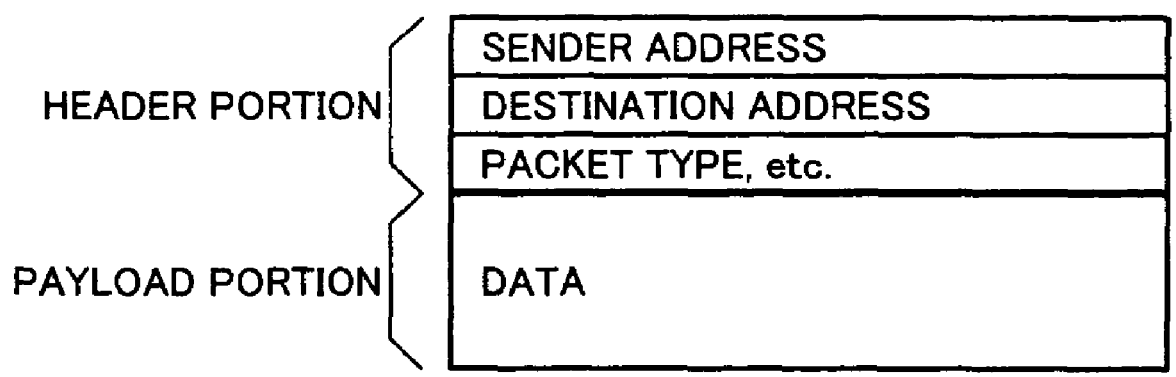
FIG. 2 is a schematic diagram describing a data packet.

As shown in FIG. 2, a packet starts with a header portion. The header portion is followed by a payload portion. The header portion describes information such as a sender address, a destination address, and packet type. The sender address describes a unique address of a sender device that has sent the packet. The destination address describes a unique address unique to a device to which the packet will be sent. In the payload portion, data to be transferred is placed. As the destination address, a broadcast address is provided. When the broadcast address is designated, the packet is sent to all devices.

FIG. 3A and FIG. 3B show outlines of the wireless stations BS1 to BS4 and BS11 to BS14 as access points, the wireless terminals TM1 and TM2, and the wireless terminals TM11 and TM12.

As shown in FIG. 3B, each of the wireless terminals TM1 and TM2 and the wireless terminals TM11 and TM12 is composed by attaching a wireless LAN interface card 11 to for example a portable personal computer 10. The wireless LAN interface card 11 comprises a Radio Frequency (RF) portion 12, a modulating and demodulating portion 13, a Media Access Controller (MAC) layer process portion 14, and an interface portion 15. The RF portion 12, the modulating and demodulating portion 13, the MAC layer process portion 14, and the interface portion 15 are controlled by a controller 16.

Data transmitted from the personal computer 10 is sent to the MAC layer process portion 14 of the wireless LAN interface card 11 through the interface portion 15. The MAC layer process portion 14 performs a control in accordance with for example the Carrier Sense Multiple Access With Collision Avoidance (CSMA/CA) system. In accordance with the CSMA/CA system, before a packet is transmitted, the MAC layer process portion 14 determines whether or not another packet is being transmitted. In addition, before a packet is transmitted, the MAC layer process portion 14 determines whether or not a packet addressed to the local device is being transmitted. When the MAC layer process portion 14 has determined that packets do not collide with each other, it enters a transmission waiting state. After a predetermined time period has elapsed, the MAC layer process portion 14 retransmits the packet. The MAC layer process portion 14 may perform a control in accordance with the Slotted-ALOHA system or Time Division Multiple Access (TDMA) system as well as the CSMA/CA system. Data that is sent from the personal computer 10 through the interface portion 15 is supplied to the MAC layer process portion 14. The MAC layer process portion 14 packetizes data received from the personal computer 10 in a predetermined format.

An output of the MAC layer process portion 14 is supplied to the modulating and demodulating portion 13. The modulating and demodulating portion 13 modulates the data received from the MAC layer process portion 14. The MAC layer process portion 14 uses for example the direct spectrum spread system that is a two-dimensional modulating system. The modulating system used for the modulating and demodulating portion 13 is not limited to the direct spectrum spread system. In other words, the frequency hopping system or the Orthogonal Frequency Division Multiplex (OFDM) system may be used. Of course, data may be modulated and demodulated in accordance with the Phase Shift Keying (PSK) system or the Frequency Shift Keying (FSK) system.

An output of the modulating and demodulating portion 13 is sent to the RF portion 12. The RF portion 12 converts the data received from the modulating and demodulating portion 13 into a 2.4 GHz band signal. The converted signal is output from an antenna 18 to the wireless stations BS1 to BS4 and BS11 to BS14 shown in FIG. 3A. However, it should be noted that the carrier frequency is not limited to the 2.4 GHz band.

When the wireless LAN interface card 11 receives a radio wave from the wireless stations BS1 to BS4 and BS11 to BS14, the received signal is sent from the antenna 18 to the RF portion 12. A received output of the RF portion 12 is supplied to the modulating and demodulating portion 13. The modulating and demodulating portion 13 demodulates the received signal and obtains received data. The received data is supplied to the MAC layer process portion 14. The MAC layer process portion 14 extracts desired data from the received packet. The received data is sent to the personal computer 10 through the interface portion 15.

In addition, the wireless LAN interface card 11 comprises an encrypting process portion 17 that encrypts and decrypts data that is sent in a wireless region. When data is encrypted and then transmitted and received, the encrypting process portion 17 designates an encryption key. With the encryption key, data to be transmitted and received to and from the antenna 18 is encrypted.

In FIG. 3A, each of the wireless stations BS1 to BS4 and BS11 to BS14 as access points is composed of a router portion 20 and a wireless portion 21. The wireless portion 21 comprises an RF portion 22, a modulating and demodulating portion 23, a MAC layer process portion 24, and an interface portion 25. The RF portion 22, the modulating and demodulating portion 23, the MAC layer process portion 24, and the interface portion 25 are controlled by a controller 26.

Data transmitted from the network through the router portion 20 is sent to the MAC layer process portion 24 through the interface portion 25. The MAC layer process portion 24 performs a control in accordance with the CSMA/CA system. The MAC layer process portion 24 packetizes data transmitted from the router portion 20 through the interface portion 25 in a predetermined format.

An output of the MAC layer process portion 24 is supplied to the modulating and demodulating portion 23. The modulating and demodulating portion 23 modulates the data received from the MAC layer process portion 24. The modulating and demodulating portion 23 uses for example the direct spectrum spread system as a modulating system. An output of the modulating and demodulating portion 23 is sent to the RF portion 22. The RF portion 22 converts the transmitted data into a 2.4 GHz signal. The 2.4 GHz band signal is output from an antenna 28 to the wireless terminals TM1, TM2, TM11, and TM12.

When a signal is received from the wireless terminals TM1, TM2, TM11, and TM12, the received signal is sent from the antenna 28 to the RF portion 22. A received output of the RF portion 22 is supplied to the modulating and demodulating portion 23. The modulating and demodulating portion 23 demodulates the received signal and obtains received data. The received data is supplied to the MAC layer process portion 24. The MAC layer process portion 24 extracts desired data form the received packet. The received data is sent to the router portion 20 through the interface portion 25.

In addition, the wireless portion 21 comprises an encrypting process portion 27 that encrypts and decrypts data that is transmitted in a wireless region. When data is encrypted and then transmitted and received, the encrypting process portion 27 designates an encryption key. With the encryption key, data transmitted and received to and from the antenna 28 is encrypted.

The wireless portion 21 of each of the wireless stations BS1 to BS4 and BS11 to BS14 has a beacon generating portion 29 that generates a beacon. When the beacon generating portion 29 generates a beacon, it generates beacon packets. The beacon packets are output from the antenna 28 through the modulating and demodulating portion 23 and the RF portion 22.

In FIG. 1, the wireless LAN network system according to the present invention has authenticating servers SV1 and SV2. The authenticating server SV1 is a Remote Authentication Dial-In User Service (RADIUS) server that authenticates a user of a wireless terminal that uses the wireless LAN network service managed and operated by the domain AAA ISP with the user ID and the password and dynamically creates an encryption key for a wireless region for each session. Likewise, the authenticating server SV2 is a RADIUS server that authenticates a user of a wireless terminal that uses the wireless LAN network service managed and operated by the domain BBB ISP with the user ID and the password and dynamically creates an encryption key for a wireless region for each session.

Figures 4A, 4B:
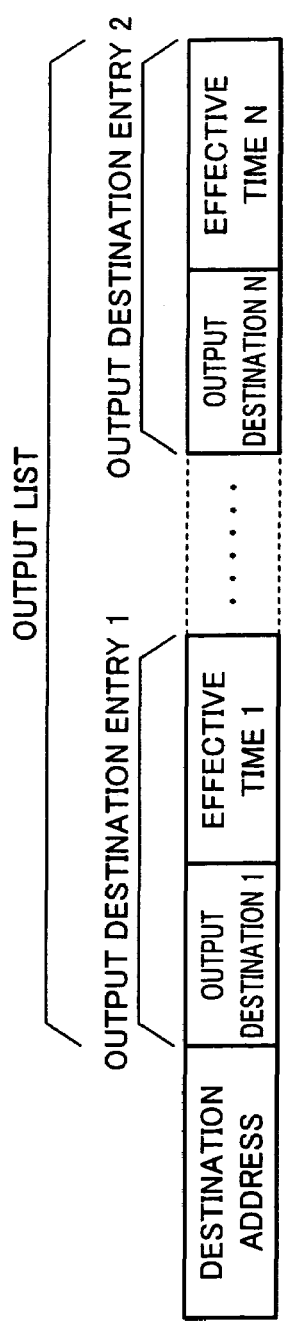
FIG. 4A and FIG. 4B are schematic diagrams describing route entry tables.
Figures 5A, 5B, 5C, 5D:
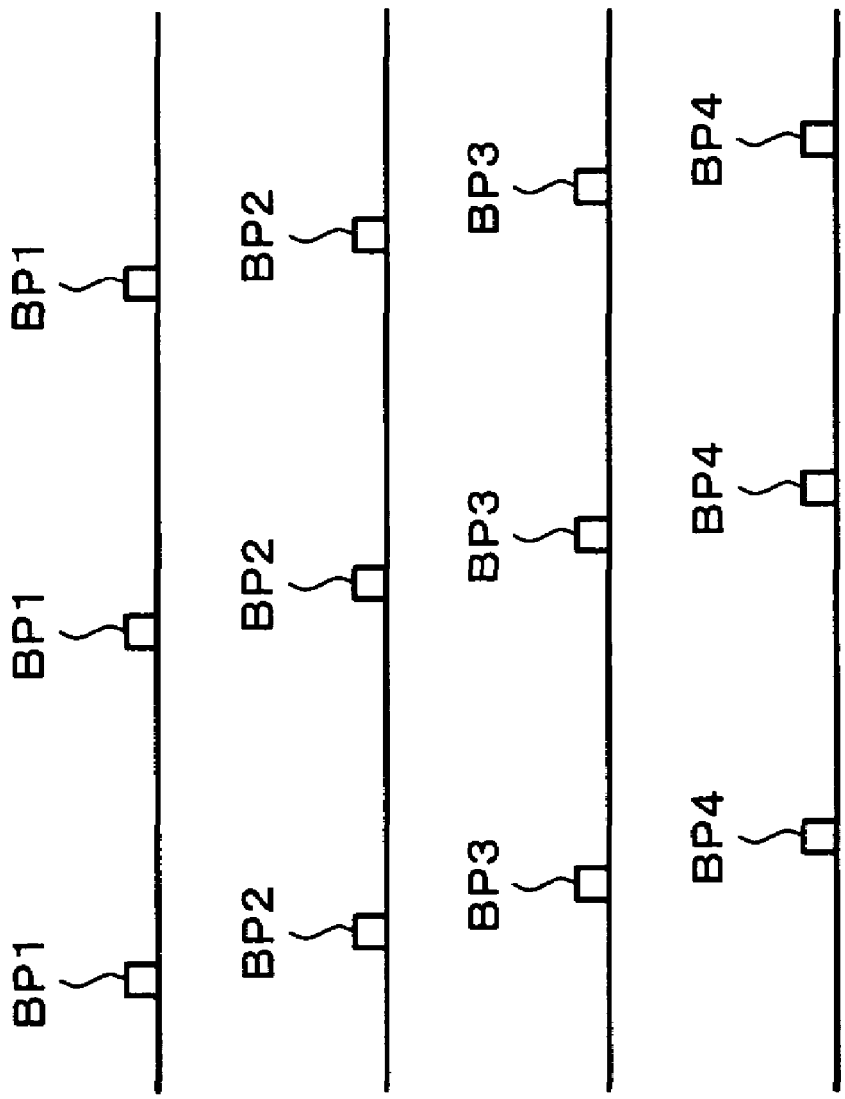
FIG. 5A, FIG. 5B, FIG. 5C, and FIG. 5D are timing charts describing beacons.

Each of the routers R1 to R3 and R11 to R13 has a route entry table. In accordance with the route entry table, each of the routers R1 to R3 and R11 to R13 routes a packet. FIG. 4A and FIG. 4B show examples of route entry tables.

A route entry table shown in FIG. 4A represents an output destination against a destination address of a downstream node of a current router. When there are a plurality of downstream nodes of a current node, a route entry table shown in FIG. 4B is used.

Now, as shown in FIG. 1, it is assumed that the wireless terminal TM1 is communicating with the wireless station BS1 and that the wireless terminal TM2 is communicating with the wireless station BS4.

In this case, the route entry table of the router R1 describes as destination addresses the addresses of the routers R2 and R3, the wireless stations BS1, BS2, BS3, and BS4, and the wireless terminals TM1 and TM2; as the output destinations to the routers R2 and R3, the routers R2 and R3; as the output destinations to the wireless stations BS1 and BS2, the router R2; as the output destinations to the wireless stations BS3 and BS4, the router R3; as the output destination to the wireless terminal TM1, the router R2; and as the output destination to the wireless terminal TM2, the router R3.

The route entry table of the router R2 describes as the destination addresses, the addresses of the wireless stations BS1 and BS2 and the wireless terminal TM1; as the output destinations to the wireless stations BS1 and BS2, the wireless stations BS1 and BS2; and as the output destination to the wireless terminal TM1, the wireless station BS1.

In such a manner, each of the route entry tables of the routers R1 to R3 and R11 to R14 and the wireless stations BS1 to BS4 and BS11 to BS14 describes the destination addresses of the downstream nodes and the output destinations to the destination addresses. In according to the route entry table, each of the routers routes a packet.

When the wireless terminals TM1, TM2, TM3, and TM4 move, it is necessary to update the route entry tables. Thus, as shown in FIG. 4B, the addresses of the output destinations are updated as the effective time elapses.

As described above, each of the wireless stations BS1 to BS4 and BS11 to BS14 has the beacon generating portion 29 (see FIG. 3A). Each of the wireless stations BS1 to BS4 and BS11 to BS14 transmits a beacon packet at intervals of a predetermined time period. The beacon packet describes relevant domain information about the wireless stations BS1 to BS4 and BS11 to BS14 as access points. In reality, the domain information is an IP address of a default router of the domain and a network prefix. The network prefix is the first half of two divided portions of a 64-bit address of the Internet Protocol version 6 (IPv6). The network prefix is an identifier of a domain to which a host is connected.

In other words, for example, the wireless stations BS1, BS2, BS3, and BS4 transmit beacon packets BP1, BP2, BP3, and BP4 at predetermined timings as shown in FIG. 5A, FIG. 5B, FIG. 5C, and FIG. 5D. Likewise, the wireless stations BS11, BS12, BS13, and BS14 transmit beacon packets at predetermined timings.

Figure 6:
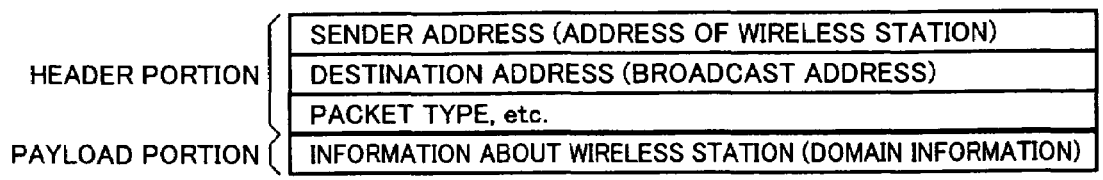
FIG. 6 is a schematic diagram describing a beacon packet.

FIG. 6 shows a structure of a beacon packet transmitted from the wireless stations BS1 to BS4 and BS11 to BS14. As shown in FIG. 6, the beacon packet describes as the sender address, the unique address of the wireless station (one of the wireless stations BS1 to BS4 and BS11 to BS14) that transmits the beacon packet; as the destination address, the broadcast address; and as the payload, domain information composed of the IP address of the default router of the domain and the network prefix.

For example, a beacon packet transmitted from the wireless station BS1 as an access point of the domain AAA describes as the sender address, the unique address of the wireless station BS1; as the destination address, the broadcast address; and as the domain information, the network prefix of the domain AAA and the IP address of the router R1 as a default router.

A beacon packet transmitted from the wireless station BS11 as an access point of the domain BBB describes as the sender address, the unique address of the wireless station BS11; as the destination address, the broadcast address; and as the domain information, the network prefix of the domain BBB and the IP address of the router R11 as a default router.

Next, an initial connecting process of the wireless LAN network system that has the foregoing structure will be described.

In FIG. 1, it is assumed that the wireless terminal TM1 of the user is connected to the wireless station BS1 as an access point and that the wireless terminal TM1 starts using the wireless LAN network service provided by the domain AAA ISP.

To wirelessly connect the wireless terminal TM1 of the user to the wireless station BS1 as an access point, the wireless terminal TM1 of the user should be placed in the service area (in which the wireless terminal TM1 has a predetermined electric field strength) of the wireless station BS1. To start the connecting process, a communication is made between the wireless terminal TM1 and the wireless station BS1. The authenticating server SV1 authenticates the user of the wireless terminal TM1 with his or her user ID and password. When the authenticating server SV1 has successfully authenticated the user of the wireless terminal TM1, the wireless station BS1 stores the authentication information. The authenticating server SV1 creates an encryption key for a wireless region between the wireless station BS1 and the wireless terminal TM1. A packet in the wireless region between the wireless terminal TM1 and the wireless station BS1 is encrypted with the encryption key.

As described above, in the system according to the present invention, the authenticating server authenticates the user with his or her user ID and password. When the authenticating server has successfully authenticated the user, it creates an encryption key for a wireless region. Since an encryption key is created for each session, the secrecy of the system according to the present invention is more improved than the conventional fixed key in accordance with the WEP system.

The stateless auto configuration of the IPv6 creates an IP address of the wireless terminal TM1. With the created IP address, the wireless terminal TM1 is connected to the backbone network NET1. The stateless auto configuration of the IPv6 is a function for automatically assigning an IPv6 address of a device connected to the network. The stateless auto configuration requires domain information such as the network prefix and default router. However, the wireless terminal TM1 of the user is capable of asking the wireless station BS1 for the domain information or obtaining it from a beacon packet received from the wireless station BS1.

In such a manner, the authenticating server SV1 authenticates the user with his or her user ID and password. The authenticating server SV1 creates an encryption key for a wireless region between the wireless terminal TM1 and the wireless station BS1. The stateless auto configuration of the IPv6 assigns an IP address of the wireless terminal TM1. As a result, the wireless terminal TM1 is capable of accessing the backbone network NET1 through the wireless station BS1, the router R2, and the router R1.

Next, the handover process will be described. When the wireless terminal TM1 moves out of the service area of the wireless station BS1 and the communication state of the wireless terminal TM1 to the wireless station BS1 deteriorates, the wireless terminal TM1 performs a handover. When the wireless terminal TM1 performs the handover, it determines the most suitable wireless station to connect next in accordance with an electric field strength of the received beacon.

In addition, the wireless terminal TM1 obtains domain information of a wireless station to which it will be probably connected next and determines whether or not to transfer authentication information in accordance with the domain information of the wireless station to which it will be probably connected next.

In other words, as shown in FIG. 5, the wireless stations BS1 to BS4 and BS11 to BS14 periodically transmit beacon packets. In accordance with the electric field strengths of the beacon packets (or error rates), the wireless terminal TM1 determines the most suitable wireless station to which it will be most properly connected next.

In addition, as shown in FIG. 6, a beacon transmitted from a wireless station contains domain information of an access network that the wireless station provides. Before a wireless terminal moves, it receives a beacon from a wireless station to which it will be probably connected next and obtains domain information from the beacon. As a result, the wireless terminal is capable of detecting its own moving granularity. When the domain of the wireless station to which the wireless terminal will be connected next is the same as the domain of the wireless station to which the wireless terminal is currently connected, authentication information is transferred to the next wireless station. If the domain of the wireless station to which the wireless terminal will be connected next is not the same as the domain of the wireless station to which the wireless terminal is currently connected, after the wireless terminal is connected to the next wireless station, the wireless terminal is newly authenticated by the authenticating server of the domain.

Now, it is assumed that the wireless terminal TM1 shown in FIG. 1 moves from the service area of the wireless station BS1 to the service area of the wireless station BS2. In this case, the wireless terminal TM1 performs a handover from the wireless station BS1 to the wireless station BS2. At that point, the wireless station BS1 and the wireless station BS2 are wireless stations having the same domain AAA. Thus, the user of the wireless terminal TM1 is authenticated by the authenticating server SV1 through the wireless station BS2. In this case, authentication information can be transferred from the wireless station BS1 to the wireless station BS2. When the authentication information is transferred from the wireless station BS1 to the wireless station BS2, a context transfer message is sent from the wireless station BS1 to the wireless station BS2. The context transfer message causes the authentication information to be sent from the wireless station BS1 to the wireless station BS2 and the encryption key is used in the wireless station BS2.

In contrast, it is assumed that the wireless terminal TM2 shown in FIG. 1 moves from the service area of the wireless station BS4 to the service area of the wireless station BS11. In this case, the wireless terminal TM2 performs a handover from the wireless station BS4 to the wireless station BS11. However, the wireless station BS4 is a wireless station of the domain AAA. In contrast, the wireless station BS11 is a wireless station of the domain BBB. In other words, the authenticating server of the wireless station BS4 is different form the authenticating server of the wireless station BS11. In this case, authentication information cannot be transferred from the wireless station BS4 to the wireless station BS11. In this case, when the wireless terminal TM2 is connected to the wireless station BS11, the wireless terminal TM2 is newly authenticated.

As described above, a beacon packet periodically transmitted from a wireless station to which a wireless station is connected contains domain information of an access network that the wireless station provides. Before the wireless terminal moves, it receives a beacon packet from a wireless station to which the wireless terminal will be probably connected next and obtains domain information. As a result, the wireless terminal is capable of detecting its own moving granularity. When the domain of the wireless station to which the wireless terminal will be connected next is the same as the domain of the wireless station to which the wireless terminal is currently connected, by creating a context transfer message containing authentication information and sending the context transfer message to the wireless station to which the wireless terminal will be connected next, it is not necessary to newly authenticate the user of the wireless terminal. In addition, the encryption information for the wireless region of the former wireless station can be used. Thus, the application of the wireless terminal can be prevented from interrupting.

In contrast, when the domain of the wireless station to which the wireless terminal will be connected next is different from the domain of the wireless station to which the wireless terminal is currently connected, after the wireless station is connected to the next wireless station, the authenticating server of the domain of the new wireless station newly performs a authenticating process for the wireless terminal. As a result, the wireless terminal can be connected to the network.

Figure 7:
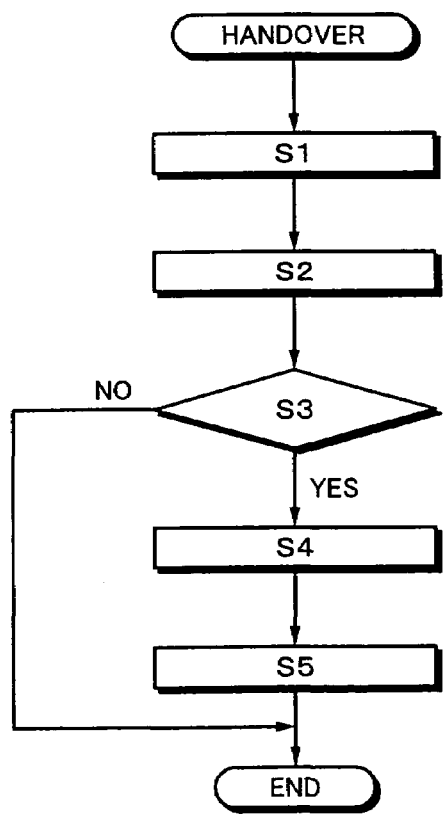
FIG. 7 is a flow chart describing a beam receiving process.
Figure 8:
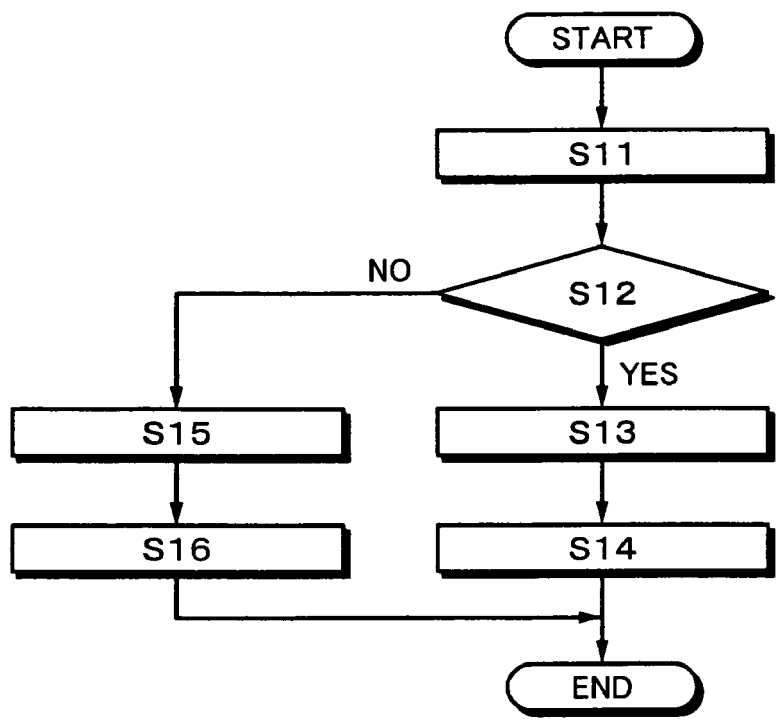
FIG. 8 is a flow chart describing a process for transmitting an authentication request message and a connection request message.

FIG. 7 and FIG. 8 are flow charts showing the foregoing processes. In FIG. 7, when a handover request is generated, a beacon packet is received from a wireless station to which a wireless terminal will be probably connected next (at step S1). Domain information of the wireless station to which the wireless terminal will be probably connected next is obtained from the received beacon packet (at step S2). It is determined whether or not authentication information should be transferred to the wireless station to which the wireless terminal will be probably connected next in accordance with the domain information thereof (at step S3). When the domain of the wireless station to which the wireless terminal is currently connected is the same as the domain of the wireless station to which the wireless terminal will be probably connected next, it is determined that the authentication information should be transferred to the wireless terminal to which the wireless terminal will be connected next. In contrast, when the domain of the wireless station to which the wireless terminal is currently connected is different from the domain of the wireless terminal to which the wireless terminal will be probably connected next, it is determined that the authentication information should not be transferred to the wireless station to which the wireless terminal will be probably connected next.

At step S3, when the determined result represents that the authentication information should be transferred to the wireless station to which the wireless terminal will be probably connected next, a context transfer message to be sent to the wireless station to which the wireless terminal will be probably connected next is created (at step S4). The context transfer message contains the authentication information. When the wireless region has been encrypted, the context transfer message contains encrypting information such as key information. The context transfer message is transferred to a router upstream of the wireless station to which the wireless terminal is currently connected (at step S5). Thereafter, the process is completed. When the determined result at step S3 represents that the authentication information should not be transferred to the wireless terminal to which the wireless terminal will be probably connected next, the context transfer message is not created. Thereafter, the process is completed.

Thus, in the system according to the present invention, when the domain of the wireless station to which the wireless terminal will be connected next is the same as the domain of the wireless station to which the wireless terminal is currently connected, the context transfer message is received through a router. The context transfer message contains the authentication information. The wireless station that has received the context transfer message transmits a handover confirmation message. At that point, when the context transfer message has been sent, the user of the wireless terminal does not need to be authenticated. When the wireless region for the wireless station to which the wireless terminal is currently connected has been encrypted, the wireless region for the wireless station to which the wireless terminal will be connected next can be encrypted with the same key information.

When the domain of the wireless station to which the wireless terminal will be connected next is different from the domain of the wireless station to which the wireless terminal is currently connected, the user of the wireless terminal is newly authenticated. When a new session is started, the authenticating server of the domain of the wireless station to which the wireless terminal will be connected next designates an encryption key.

In FIG. 8, when the handover confirmation message is received (at step S11), it is determined whether or not the context transfer message has been transmitted to the wireless station to which the wireless terminal will be connected next (at step S12). When the context transfer message has been transmitted to the wireless station to which the wireless terminal will be probably connected next, a connection request message to be sent to the wireless station to which the wireless terminal will be probably connected next is created (at step S13). The created context transfer message is transmitted to the wireless station to which the wireless terminal will be probably connected next (at step S14).

When the determined result at step S12 represents that the context transfer message has not been transmitted, since the user of the wireless terminal should be newly authenticated, an authentication request message to be sent to the authenticating server through the wireless station to which the wireless terminal will be probably connected next is created (at step S15). The created authentication request message is transmitted to the wireless station (at step S16).

Figure 9:
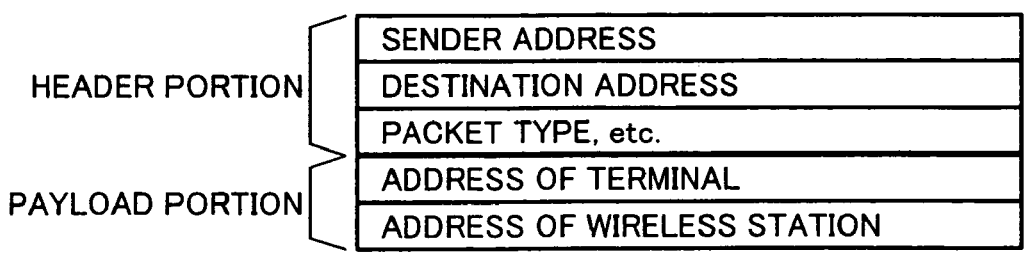
FIG. 9 is a schematic diagram describing a handover request packet.

FIG. 9 shows an example of a packet of a handover request message that a wireless terminal transmits to a wireless station to which the wireless terminal is currently connected to request the wireless terminal for a handover. As shown in FIG. 9, the packet has a header portion and a payload portion. The header portion describes as a sender address a unique address of a wireless terminal; and as a destination address a unique address of a wireless station to which a wireless terminal is currently connected. The payload portion describes an address of a wireless terminal and an address of a wireless station that the wireless terminal requests to be newly connected.

Figure 10:
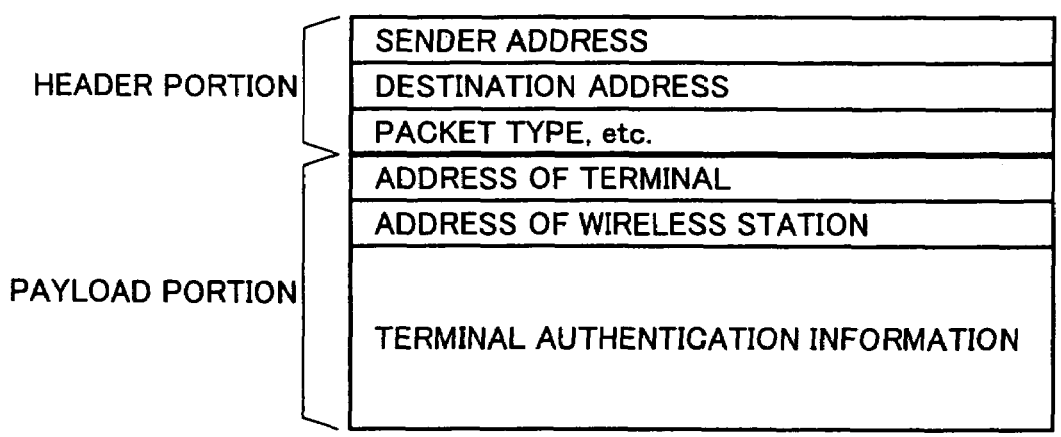
FIG. 10 is a schematic diagram describing a context transfer message.

FIG. 10 shows an example of a context transfer message that a wireless station to which a wireless terminal is currently connected transmits a wireless station to which the wireless terminal will be connected next when the domain of the former wireless station is the same as the domain of the latter wireless station. The context transfer message contains authentication information that has been authenticated between a wireless terminal and a wireless station to which that the wireless terminal is currently connected.

As shown in FIG. 10, the context transfer message has a header portion and a payload portion. The header portion describes as a sender address a unique address of a wireless terminal to which the context transfer message is transmitted and as a destination address a unique address of a wireless station that receives the context transfer message. The payload portion describes an address of a wireless terminal, an address of a wireless station, and authentication information. The authentication information may contain information such as a user ID and a password and encryption information for a wireless region such as an encryption key. In addition, the context transfer message may contain output channel information and so forth.

Figure 11:
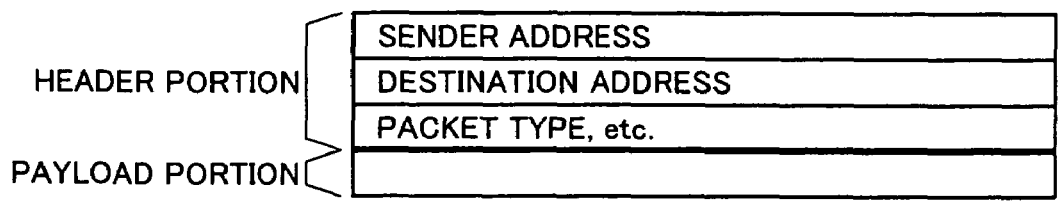
FIG. 11 is a schematic diagram describing a handover confirmation message.

FIG. 11 is an example of an handover confirmation message transmitted to a wireless terminal from a wireless station to which the wireless terminal will be connected next. As shown in FIG. 11, the handover confirmation message has a header portion. The header portion describes as a sender address a unique address of a wireless station and as a destination address a unique address of a wireless terminal that will be connected to the wireless station.

Figure 12:
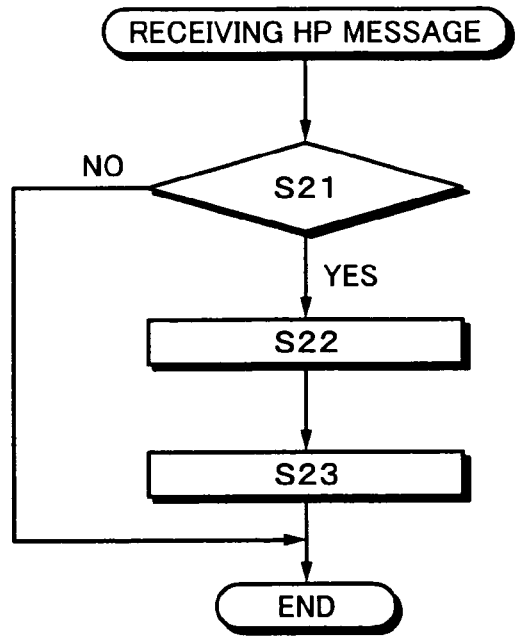
FIG. 12 is a schematic diagram describing a process for a handover request message.

FIG. 12 is a flow chart showing a process performs by a wireless station that creates a context transfer message in accordance with a handover request message received from a wireless terminal.

In FIG. 12, when a handover request message has been received, it is determined whether or not a wireless terminal whose address is contained in the handover request message is present in the service area of the wireless station (at step S21). When the wireless terminal is present in the service area of the wireless station, a context transfer message is created in accordance with the received handover request message (at step S22). As shown in FIG. 10, the context transfer message contains the terminal authentication information. As a destination of the context transfer message, an address of a wireless station to which the wireless terminal will be connected is added to the context transfer message. The context transfer message is transmitted to the upstream portion (at step S23). Thereafter, the process is completed. When the determined result at step S21 represents that the wireless terminal whose address is contained in the handover request message is not present in the service area of the wireless station, the process is completed.

Figure 13:
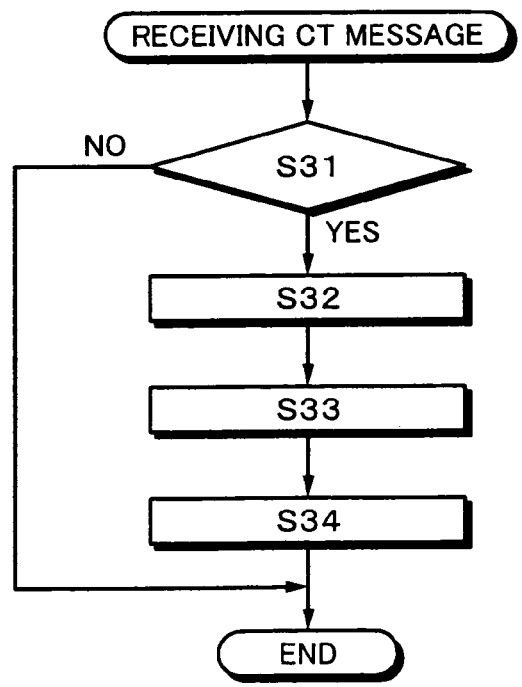
FIG. 13 is a schematic diagram describing a process for a context transfer message.

FIG. 13 is a flow chart showing a process performed by a wireless station that receives a context transfer message from a wireless station that is currently connected to the wireless station. As described above, the context transfer message contains authentication information. With the authentication information, the wireless terminal does not need to be newly authenticated.

In FIG. 13, it is determined whether or not the address of the wireless station contained in the received context transfer message matches the address of the local wireless station (at step S31). When the address of the wireless station contained in the received context transfer message matches the address of the local wireless station, authentication information about the wireless terminal is obtained from the information about the wireless terminal contained in the received context transfer message (at step S32). Authentication for the relevant wireless terminal is designated in accordance with the authentication information of the wireless terminal contained in the context transfer message so that the wireless terminal can be connected (at step S33). A handover confirmation message is transmitted to the address of the wireless terminal contained in the received context transfer message (at step S34). Since the wireless station to which the wireless terminal will be newly connected is capable of designating the authentication for the wireless terminal using the authentication information contained in the context transfer message, the wireless terminal does not need to be newly authenticated. At that point, encryption information such as an encryption key that is used for the wireless station to which the wireless terminal is currently connected can be used for the wireless station to which the wireless terminal will be newly connected. Thus, the wireless terminal is capable of directly communicating with the wireless station to which the wireless terminal will be newly connected.

Figure 14:
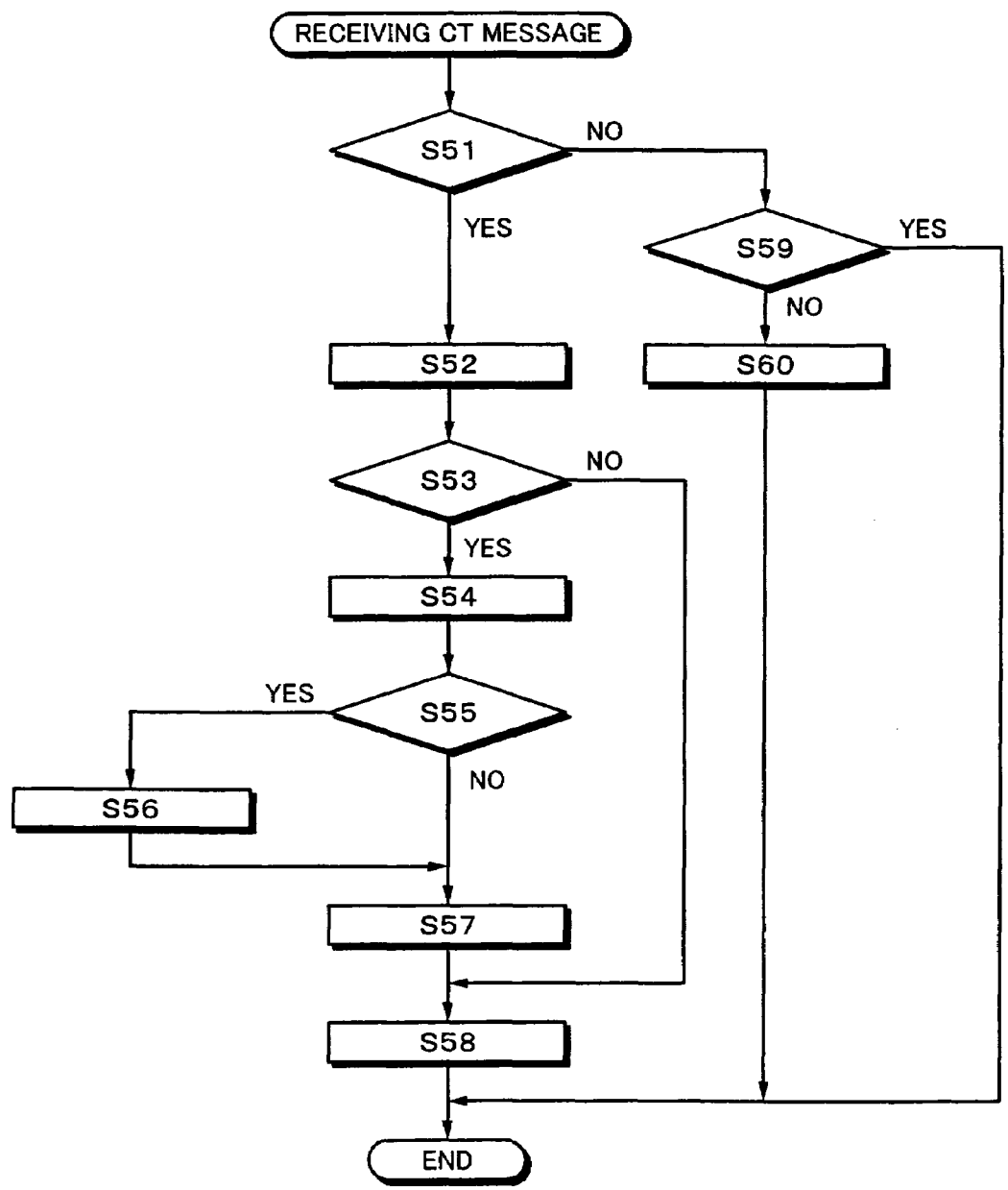
FIG. 14 is a schematic diagram describing a process for a context message performed by a router.

FIG. 14 is a flow chart showing a process for rewriting a route entry table of each router upon occurrence of a handover.

In FIG. 14, when a context transfer message is received by each router, it is determined whether or not the address of the wireless station contained in the received context transfer message matches an entry of the destination addresses contained in the route entry table (at step S51).

When the address of the wireless station matches one entry of the destination addresses contained in the route entry table, an entry of an output destination in the match entry is stored (at step S52).

Thereafter, it is determined whether or not the address of the wireless terminal contained in the received context transfer message matches one entry of the destination addresses contained in the route entry table (at step S53).

When the address of the wireless terminal contained in the received context transfer message does not match any entry of the destination addresses contained in the route entry table, the received context transfer message is transferred to the output destination of the output entry stored at step S52 (at step S58). Thereafter, the process is completed.

When the address of the wireless terminal contained in the received context transfer message matches one entry of the destination addresses contained in the route entry table, the matched entry is stored (at step S54).

Thereafter, it is determined whether or not the output destination of the output destination entry stored at step S52 is contained in the output destination list at the entry position stored at step S4 (at step S55).

When the determined result at step S55 represents that the output destination of the output destination entry stored at step S52 is contained in the output destination list at the entry position stored at step S4, the effective time of the corresponding output entry is updated to the effective time of the received packet (at step S56). The output destination entry stored at step S52 is added to the output destination list at the entry position stored at step S54 (at step S57).

When the determined result at step S55 represents that the output destination of the output destination entry stored at step S52 is not contained in the output destination list at the entry position at step S4, the output destination entry stored at step S52 is added to the output destination list at the entry position stored at step S54 (at step S57).

The received context transfer message is transferred to the output destination of the output entry stored at step S52 (at step S58). Thereafter, the process is completed.

When the determined result at step S51 represents that the address of the wireless station contained in the received context transfer message does not match any entry of the destination addresses contained in the route entry table, it is determined whether or not the context transfer message has arrived from an upstream portion (at step S59).

When the determined result at step S59 represents that the received context transfer message has arrived from an upstream portion, the context transfer message is transferred to the upstream portion (at step S60). Thereafter, the process is completed.

When the determined result at step S59 represents that the received context transfer message has arrived from the upstream portion, the process is completed.

In the foregoing process, when a handover takes place and a context transfer message is transmitted, a route entry table of a relevant router is updated.

Thus, in the wireless LAN network service according to the present invention, the authenticating servers SV1 and SV2 are disposed. Each authenticating server authenticates the user with his or her user ID and password, dynamically creates an encryption key for each session, and encrypts a wireless region with the encryption key. Thus, the security of the wireless region is improved.

In addition, a wireless station to which a wireless terminal will be connected periodically transmits a beacon packet. The beacon packet contains domain information of an access network that the wireless station provides. Before the wireless terminal moves, it receives a beacon packet from a wireless station to which the wireless terminal will be probably connected next and obtains information of the domain from the beacon packet. As a result, the wireless terminal is capable of detecting its own moving granularity. When the domain of the wireless station to which the wireless terminal will be probably connected next is the same as the domain of the wireless station to which the wireless terminal is currently connected, a context transfer message that contains authentication information is created and transmitted to the wireless station to which the wireless terminal will be connected next. As a result, the wireless terminal does not need to be newly authenticated. In addition, the wireless station to which the wireless terminal will be connected next is capable of using the encryption information for the wireless region of the wireless station to which the wireless terminal is currently connected.

Figure 15:
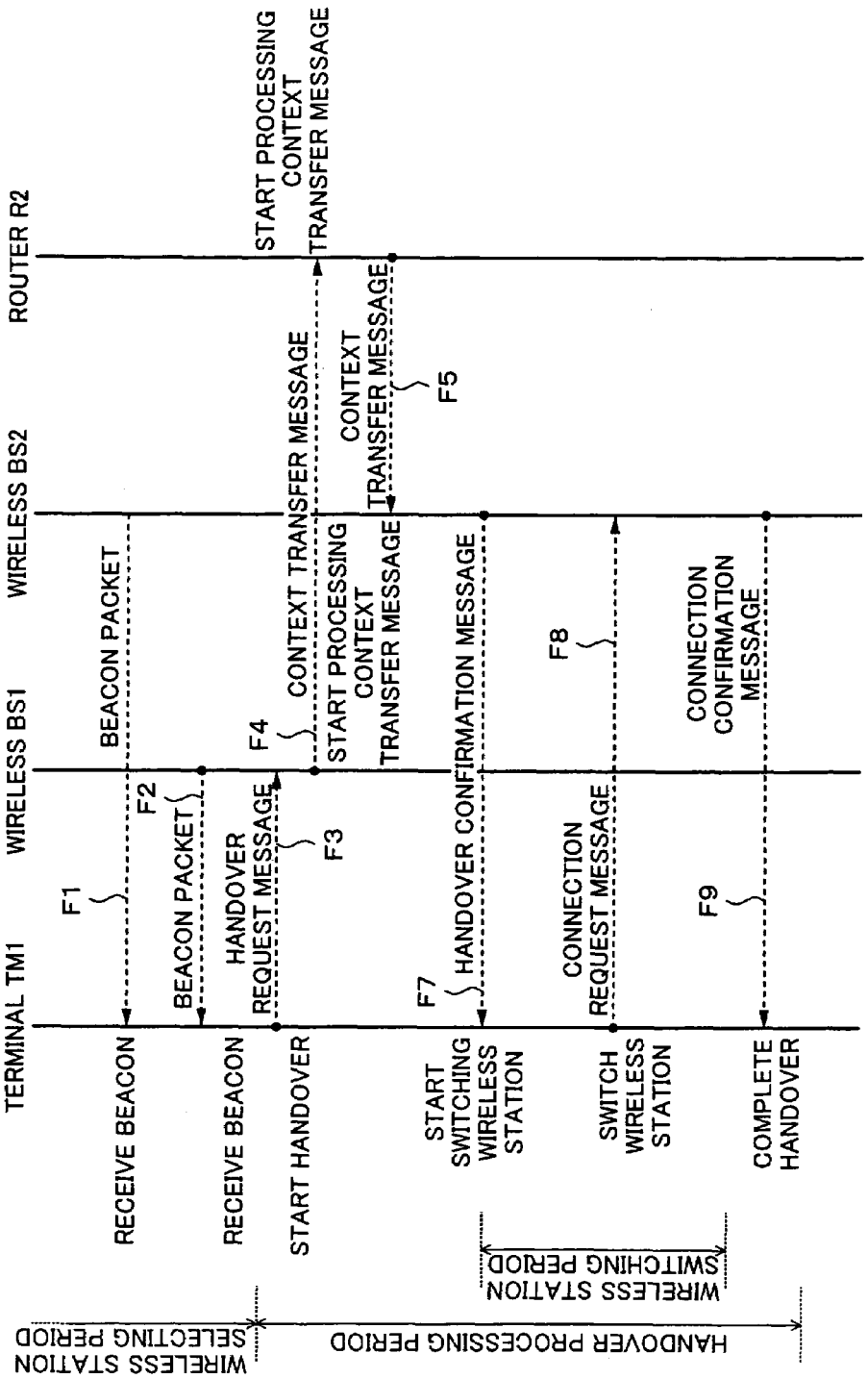
FIG. 15 is a sequence diagram describing a handover process.

FIG. 15 is a sequence chart showing a process for causing the wireless terminal TM1 to perform a handover from the wireless station BS1 to the wireless station BS2. When the wireless terminal TM1 performs a handover from the wireless station BS1 to the wireless station BS2, since the wireless terminal TM1 moves in the same domain, the context transfer message is transferred from the wireless station BS1 to the wireless station BS2. When the wireless terminal TM1 is connected to the wireless station BS2, the wireless terminal TM1 does not need to be authenticated.

In FIG. 15, the wireless terminal TM1 receives a beacon packet from the wireless station BS2 to which the wireless terminal TM1 will be probably connected next and a beacon packet from the wireless station BS1 to which the wireless terminal TM1 is currently connected (processes F1 and F2).

As the wireless terminal TM1 moves from the service area of the wireless station BS1 to the service area of the wireless station BS2, when the receiving state varies, the wireless terminal TM1 transmits a handover request message that causes the wireless terminal TM1 to be connected to the wireless station BS2 to the wireless station BS1 to which the wireless terminal TM1 is currently connected (process F3).

When the wireless station BS1 has received the handover request message, the wireless station BS1 creates a context transfer message for the wireless station BS2 to which the wireless terminal TM1 will be connected next and transmitted the created context transfer message to the upstream router R2 (process F4). The context transfer message contains authentication information. The context transfer message is transmitted to the wireless station BS2 through the router R2 (process F5).

When the wireless station BS2 to which the wireless terminal TM1 will be newly connected has received the context transfer message, the wireless station BS2 performs a process for connecting the wireless terminal TM1. At that point, authentication information has been transmitted as the context transfer message. The wireless station BS2 uses the authentication information contained in the context transfer message. Thus, the wireless terminal TM1 does not need to be newly authenticated. The wireless station BS2 uses the encryption key used in the wireless station BS1. In return, the wireless station BS2 to which the wireless terminal TM1 will be newly connected sends a handover confirmation message to the wireless terminal TM1. The handover confirmation message is delivered to the wireless terminal TM1 (process F7).

When the wireless terminal TM1 that had requested the wireless station BS1 for the handover has received the handover confirmation message from the wireless station BS2 to which the wireless terminal TM1 will be newly connected, the wireless terminal TM1 sends a connection request message to the wireless station BS2 to which the wireless terminal TM1 will be newly connected (process F8). When the wireless station BS2 has sent a connection confirmation message to the wireless terminal TM1 in return (process F9), the handover is completed.

As described above, in the wireless LAN network according to the present invention, a wireless station to which a wireless terminal will be connected periodically transmits a beacon packet. The beacon packet contains domain information of an access network that the wireless station provides. Before the wireless terminal moves, it receives a beacon packet from a wireless station to which the wireless terminal will be probably connected next and obtains the domain information from the beacon packet. As a result, the wireless terminal is capable of detecting its own moving granularity.

As a protocol of the data link layer, for example the IEEE 802.11 and the IEEE 802.1x can be used. As a protocol of the network layer, the IPv6 can be used. However, it should be noted that the present invention is not limited to those protocols. Any protocol can be used for the data link layer as long as the protocol allows a user to be authenticated. In addition, as a protocol of the network layer, the IPv4 may be used.

According to the present invention, a wireless station to which a wireless terminal will be connected periodically transmits a beacon. The beacon contains domain information of an access network that the wireless station provides. Before the wireless terminal moves, it receives a beacon from a wireless station to which the wireless terminal will be probably connected next and obtains domain information from the beacon. As a result, the wireless terminal is capable of detecting its own moving granularity. The wireless terminal determines whether to transfer authentication information to a wireless station to which the wireless terminal will be probably connected next or cause a authenticating server to authenticate the wireless terminal after it is connected to a wireless station to which the wireless terminal will be connected next. As a result, the wireless terminal is capable of selecting and determining an authenticating means in consideration of its own moving granularity.

The invention claimed is:

1. A wireless information transferring system, comprising:
   a plurality of wireless stations;
   a wireless terminal configured to be wirelessly connectable to the plurality of wireless stations;
   a router configured to connect the plurality of wireless stations and a network; and
   an authenticating server configured to authenticate the wireless terminal,
   wherein the wireless stations are configured to periodically transmit beacons that contain domain information identifying access networks that the wireless stations provide,
   wherein when a particular wireless terminal is in a handover condition requiring a handover from a present wireless station currently connected to the particular wireless terminal to a handover wireless station, the particular wireless terminal is configured to receive a beacon from the handover wireless station before the handover to obtain domain information of the handover wireless station from the beacon, to determine that authentication information should be transferred to the handover wireless station when the domain information of the handover wireless station is identical to the domain information of the present wireless station, or to determine that the authenticating server should newly perform an authenticating process relative to the particular wireless terminal after it is connected to the handover wireless station when the domain information of the handover wireless station is not identical to the domain information of the present wireless station,
   wherein when the determined result represents that the authentication information should be transferred to the handover wireless station, the authentication information is transferred to the handover wireless station, and
   wherein when the determined result represents that the authenticating server should newly perform the authenticating process for the particular wireless terminal after the particular wireless terminal is connected to the handover wireless station, the authenticating server newly performs the authenticating process for the particular wireless terminal after it is connected to the handover wireless station.

2. The wireless information transferring system as set forth in claim 1,
   wherein when the authentication information has been transferred to the handover wireless station, the handover wireless station is configured to wirelessly communicate with the particular wireless terminal after the handover using the transferred authentication information.

3. The wireless information transferring system as set forth in claim 1,
   wherein when the authentication information transferred to the handover wireless station contains encryption information for a wireless region after the authentication information has been transferred to the handover wireless station, the handover wireless station is configured to wirelessly communicate with the particular wireless terminal after the handover using the transmitted encryption information.

4. A wireless communicating method for a wireless information transferring system having a plurality of wireless stations; a wireless terminal being wirelessly connectable to the plurality of wireless stations; a router for connecting the plurality of wireless stations with a network; and an authenticating server for authenticating the wireless terminal, the wireless communicating method comprising:
causing the wireless stations to periodically transmit beacons that contain domain information of access networks that the wireless stations provide;
determining that a particular wireless network connected to a present wireless station is in a handover condition requiring the particular wireless network connection to be changed to a connection with a handover wireless station;
causing the particular wireless terminal to receive a beacon from the handover wireless station to obtain domain information of the handover wireless station from the beacon;
determining that authentication information should be transferred to the handover wireless station when the domain information obtained from the beacon of the handover wireless station is identical to the domain information of the present wireless station or that the authenticating server should newly perform an authenticating process for the particular wireless terminal after handover when the particular wireless terminal is connected to the handover wireless station based on the domain information obtained from the beacon of the handover wireless station not being identical to the domain information of the present wireless station;
transferring the authentication information to the handover wireless station when the determined result represents that the authentication information should be transferred to the handover wireless station; and
causing the authenticating server to newly perform an authenticating process relative to the particular wireless terminal, when the determined result represents that the authenticating server should newly perform the authenticating process for the particular wireless terminal after handover when the particular wireless terminal is connected to the handover wireless station.

5. The wireless communicating method as set forth in claim 4,
wherein the authentication information transferred to the handover wireless station contains encryption information for a wireless region.

6. The wireless communicating method as set forth in claim 4, further comprising:
causing the handover wireless station to wirelessly communicate with the particular wireless terminal using the transferred authentication information when the authentication information has been transferred to the handover wireless station.

7. The wireless communicating method as set forth in claim 4, further comprising:
causing the handover wireless station to wirelessly communicate with the particular wireless terminal using encryption information when the authentication information transferred to the wireless station contains encryption information relative to a wireless region after the authentication information has been transferred to the handover wireless station.

8. A wireless terminal apparatus, comprising:
means for receiving a beacon from a handover wireless station when the wireless terminal apparatus is in a communication condition indicating that a handover from the present wireless station that the wireless terminal apparatus is currently connected to is needed to prevent a loss of communication;
means for obtaining domain information of the handover wireless station from the beacon and determining that authentication information should be transferred to the handover wireless station when the domain information obtained from the beacon of the handover wireless station is identical to the domain information of the present wireless station or determining that an authenticating server should newly perform an authenticating process for the wireless terminal apparatus after it is connected to the handover wireless station based on the domain information obtained from the beacon of the handover wireless station being different from the domain information of the present wireless station;
means for transmitting the authentication information to the handover wireless station when the determined result represents that the authentication information should be transferred to the handover wireless station; and
means for causing the authenticating server to newly perform the authenticating process for the wireless terminal apparatus after it is connected to the handover wireless station when the determined result represents that the authenticating server should newly perform the authenticating process for the wireless terminal apparatus.

9. A wireless terminal apparatus comprising:
means for receiving a beacon from a handover wireless station when the wireless terminal apparatus is in a communication condition indicating that a handover from the present wireless station that the wireless terminal apparatus is currently connected to is needed to prevent a loss of communication;
means for obtaining domain information of the handover wireless station from the beacon and determining whether authentication information should be transferred to the handover wireless station or that an authenticating server should newly perform an authenticating process for the wireless terminal apparatus after it is connected to the handover wireless station;
means for transmitting the authentication information to the handover wireless station when the determined result represents that the authentication information should be transferred to the handover wireless station; and
means for causing the authenticating server to newly perform the authenticating process for the wireless terminal apparatus after it is connected to the handover wireless station when the determined result represents that the authenticating server should newly perform the authenticating process for the wireless terminal apparatus,
wherein when the authentication information has been transferred to the handover wireless station, the authenticating process for the handover wireless station is omitted.

10. A wireless terminal apparatus comprising:
means for receiving a beacon from a handover wireless station when the wireless terminal apparatus is in a communication condition indicating that a handover from the present wireless station that the wireless terminal apparatus is currently connected to is needed to prevent a loss of communication;

means for obtaining domain information of the handover wireless station from the beacon and determining whether authentication information should be transferred to the handover wireless station or that an authenticating server should newly perform an authenticating process for the wireless terminal apparatus after it is connected to the handover wireless station;

means for transmitting the authentication information to the handover wireless station when the determined result represents that the authentication information should be transferred to the handover wireless station; and means for causing the authenticating server to newly perform the authenticating process for the wireless terminal apparatus after it is connected to the handover wireless station when the determined result represents that the authenticating server should newly perform the authenticating process for the wireless terminal apparatus, wherein when the authentication information transferred to the handover wireless station contains encryption information for a wireless region, the wireless terminal apparatus is configured to wirelessly communicate with the handover wireless station with the same encryption information as the present wireless station.

\* \* \* \* \*